United States Patent Office 3,342,857
Patented Sept. 19, 1967

3,342,857
PROCESS FOR THE PREPARATION OF HYDROXYTRIMESIC ACID
Bernhard Raecke, Dusseldorf, Germany, assignor to Henkel & Cie, G.m.b.H., Dusseldorf-Holthausen, Germany, a corporation of Germany
No Drawing. Filed July 3, 1963, Ser. No. 292,728
Claims priority, application Germany, Aug. 30, 1962, H 46,792
5 Claims. (Cl. 260—521)

This invention relates to a new method for the production of hydroxytrimesic acid by the direct carbonation of phenol and carboxylated phenols in the presence of potassium carbonate.

The simplest way for the preparation of salicylic acid from phenol is the so-called Marasse reaction (German Patents 73,279, 76,441 and 78,708). In accordance with this process, phenol is heated with potassium carbonate and carbon dioxide under pressure. In accordance with the teachings of Marasse, a reaction temperature between 130 and 160° C. is most favorable, whereas at other temperatures the reaction proceeds considerably slower.

The Marasse reaction has recently been the subject-matter of thorough investigations (see Monatshefte fur Chemie, vol. 81, pp. 1075–1091; The Journal of Organic Chemistry, vol. XV, pp. 233–236 and vol. XIX, pp. 510–514). In accordance with the last-mentioned publication, Baine et al. altered the conditions of the Marasse reaction in a variety of ways. For instance, they worked at temperatures of 100–250° C. and obtained, starting from phenol, not only salicylic acid but also minor amounts of 4-hydroxy isophthalic acid. These authors advanced the opinion (loc. cit. p. 511) that a change in the reaction period and in the carbon dioxide pressure has only a minor influence upon the yield and upon the type of aromatic hydroxy carboxylic acid formed thereby.

An object of the present invention is the development of a process for the production of hydroxytrimesic acid or 4-hydroxy-1,3,5-tricarboxylbenzene starting from phenol.

Another object of the invention is the development of a process for the production of a tricarboxylate selected from the group consisting of hydroxytrimesic acid and its potassium salts which comprises the steps of reacting a phenol reactant selected from the group consisting of phenol, orthohydroxybenzoic, parahydroxybenzoic acid, 2-hydroxyisophthalic acid, 4-hydroxyisophthalic acid, alkali metal salts thereof and mixtures thereof, with carbon dioxide in the presence of potassium carbonate under a superatmospheric pressure of carbon dioxide at a temperature above 250° C., and recovering said tricarboxylate.

These and other objects of the invention will become more apparent as the description thereof proceeds.

It has now been found that by reaction with carbon dioxide in the presence of potassium carbonate it is possible to obtain not only salicylic acid and hydroxy isophthalic acid from phenol but also hydroxytrimesic acid or its potassium salt with very good yields if the reaction is performed under a superatmospheric pressure of carbon dioxide at temperatures above 250° C. The free acid may be recovered in known fashion from the potassium salt formed thereby.

The starting materials for the reaction according to the present invention may be not only phenol, which does not need to be particularly purified, but also partially carboxylated phenols, that is, ortho- and para-hydroxy benzoic acid, 2- or 4-hydroxy isophthalic acid or mixtures thereof. Also, the alkali metal salts of the above-mentioned compounds, such as the potassium or sodium salts, may be used as starting materials. However, it is well known that the advantage of the Marasse reaction resides particularly in that it is possible to start from free phenol and that it is not necessary to prepare the alkali metal phenolate first.

It is advantageous to employ dry potassium carbonate. However, it has been found that small amounts of water do not noticeably interfere with the reaction. For achievement of good yields, it is necessary that the potassium carbonate be employed in a certain excess above the amount theoretically required for salt formation of the carboxyl group of the reaction product. Most advantageously, the potassium carbonate is employed in an amount of about 3 mols or more per mol of phenol, hydroxybenzoic acid or hydroxy isophthalic acid. If the starting material is an alkali metal salt of these compounds, the required amount of potassium carbonate is correspondingly reduced. It is further advantageous to employ the potassium carbonate in pulverized form and to admix it thoroughly with the starting material.

In addition, it is advantageous if the reaction mixture is admixed with finely divided inert additives. Such additives are, for example, sand, kieselgur, finely divided silicon dioxide, metal powders, metal shavings, finely divided metallic oxides, such as aluminum oxide, inert salts such as sodium sulfate, and the like. Sintering of the reaction mixture is prevented by these additives.

Small amounts of metals such as cadmium, zinc, etc., and compounds of these metals, such as their oxides, etc., can likewise be admixed with the reactants. In some instances the presence of these metals and their compounds may exert a catalytic effect.

The carbon dioxide pressure which is applied is limited upwardly solely by economic and technical considerations and may, if desired, be more than 1000 atmospheres. At temperatures around 300° C., relatively low pressures of about 100 to 200 atmospheres are sufficient to achieve a practically quantitative yield. If a pressure of less than 100 atmospheres is applied, some 4-hydroxyisophthalic acid and salicylic acid are formed as side products in addition to hydroxytrimesic acid. The minimum pressure required in each case may readily be determined by preliminary tests. The amount of carbon dioxide present in the reaction vessel must be at least large enough so that sufficient carbon dioxide is present for introduction of the desired number of carboxyl groups into the molecule of the starting material and so that in addition a certain superatmospheric pressure can also be maintained. Consumed carbon dioxide can be replaced in the course of the reaction, if desired, by introduction under pressure. After the reaction has gone to completion the unreacted carbon dioxide may be recovered and may be employed anew.

The optimum reaction temperature lies between about 275 and 325° C. It is advantageous not to increase the temperature substantially above 325° C. because otherwise a reduction of the yield occurs. This reduction in yield, however, can be compensated at not too excessively high temperatures of up to 350° C. by the application of higher pressures.

The reaction according to the present invention can be performed in the customary pressure vessels. In order to avoid local overheating and partial decomposition caused thereby, it may be advantageous, if larger batches are involved, to maintain the reaction mixture in motion during the performance of the reaction according to the invention. This may be accomplished, for example, by working in an autoclave provided with a stirrer, a shaker autoclave or a rotating autoclave or in devices containing worm screws or Redler conveyors. Uniform heating may, however, also be effected by performing the reaction in thin layers, with or without agitation. However, good yields are also obtained without any of these measures, provided care is taken that strong local overheating is avoided.

The process according to the present invention may also be performed by passing carbon dioxide as well as, if desired, phenol in gaseous or finely divided state through a fluidized bed or through a moving bed of potassium carbonate as well as other solid starting materials, if desired.

The recovery of the reaction product is simple. In general, it is separated by dissolving the salt of the hydroxytrimesic acid formed by the reaction in water and liberating the free acid or its difficulty soluble monopotassium salt by addition of an inorganic or organic, gaseous, liquid or solid acid. If desired, the potassium compounds may be recovered from the mother liquor by separation by filtration in accordance with known methods, and these potassium compounds may again be recycled into the process after suitable purification.

Hydroxytrimesic acid, which has an analgesic activity and represents a useful starting material for the preparation of plastics, has been made accessible in simpler and more economical fashion by the process according to the present invention.

The following specific embodiments of the invention are presented for illustration and to enable one skilled in the art to better understand and practice the invention. They are not, however, to be construed as limitative.

The examples were performed in a 0.5 liter high-pressure autoclave which was provided with several temperature measuring points in order to avoid local overheating of the reaction mixture. At the beginning of each run, the air present in the autoclave was removed by flushing with carbon dioxide.

EXAMPLE 1

142 gm. of dry potassium carbonate, 31 gm. of phenol and 50 gm. of dry kieselgur were thoroughly admixed with each other with the aid of a ball mill. The mixture was introduced into the autoclave and was heated for five hours at a temperature of 300° C. Prior to heating, an amount of carbon dioxide was introduced under pressure such that a final pressure of 1470 atmospheres developed at the reaction temperature.

After cooling and releasing the pressure from the autoclave, the reaction product was extracted with ether in order to determine the amount of unreacted phenol. 4.9 gm. of phenol were recovered.

The powdery reaction products freed from phenol were subsequently dissolved in 1.5 liter of hot water, filtered and acidified with concentrated hydrochloric acid. After cooling, the precipitated free hydroxytrimesic acid was separated by vacuum filtration. The mother liquor was extracted with ether in order to determine the amount of carboxylic acids which may possibly have formed as side products. The yield was 57.5 gm. of pure hydroxytrimesic acid. This corresponds to 91.4% of theory, based on the amount of reacted phenol.

EXAMPLE 2

In the following example and the subsequent Examples 3–12, the process was performed in the same manner as in Example 1:

Starting materials ------- 142 gm. potassium carbonate.
31 gm. phenol.
50 gm. kieselgur.
Reaction temperature ---- 350° C.
Duration of heating ----- 1 hour.
$CO_2$-maximum pressure -- 1220 atmospheres.
Recovered phenol ------- 3.8 gm.
Yield of pure hydroxytrimesic acid ----------- 58.0 gm.

EXAMPLE 3

Starting materials ------- 142 gm. potassium carbonate
31 gm. phenol.
50 gm. kieselgur.
2 gm. cadmium oxide.
Reaction temperature ---- 350° C.
Duration of heating ----- 5 hours.
$CO_2$-maximum pressure -- 1440 atmospheres.
Recovered phenol ------- 3.7 gm.
Yield of pure hydroxytrimesic acid ----------- 59.5 gm.

EXAMPLE 4

Starting materials ------- 142 gm. potassium carbonate.
20 gm. phenol.
12 gm. dry finely divided silicic acid (commercial product "Aerosil," registered trademark).
2 gm. zinc oxide.
Reaction temperature ---- 300° C.
Duration of heating ----- 5 hours.
$CO_2$-maximum pressure -- 250 atmospheres.
Recovered phenol ------- 1.6 gm.
Yield of pure hydroxytrimesic acid --------- 41.8 gm. (94.5% of theory).

EXAMPLE 5

Starting materials ------- 142 gm. potassium carbonate.
37.2 gm. monopotassium salicylate.
12 gm. "Aerosil."
Reaction temperature ---- 300° C.
Duration of heating ----- 5 hours.
$CO_2$-maximum pressure -- 250 atmospheres.

For purification the product in this case was merely dissolved in 1 liter of water and was acidified with concentrated hydrochloric acid. The yield was 46.7 gm. of hydroxytrimesic acid (97.8% of theory).

EXAMPLE 6

Starting materials ------- 142 gm. potassium carbonate.
20 gm. phenol.
12 gm. "Aerosil."
Reaction temperature ---- 280° C.
Duration of heating ----- 5 hours.
$CO_2$-maximum pressure -- 250 atmospheres.
Recovered phenol ------- 1.4 gm.
Yield of pure hydroxytrimesic acid --------- 45.3 gm. (97.2% of theory).

EXAMPLE 7

Starting materials ------- 142 gm. potassium carbonate.
20 gm. phenol.
12 gm. "Aerosil."
Reaction temperature ---- 300° C.
Duration of heating ----- 5 hours.
$CO_2$-maximum pressure -- 80 atmospheres.
Recovered phenol ------- 1.9 gm.
Yield -------------------- 35.7 gm. of an acid mixture, consisting of 81% hydroxytrimesic acid, 4% 4-hydroxy isophthalic acid, 11% salicylic acid.

EXAMPLE 8

Starting materials ------- 142 gm. potassium carbonate.
24.7 gm. sodium phenolate.
12 gm. "Aerosil."
Reaction temperature ---- 300° C.
Duration of heating ----- 5 hours.
$CO_2$-maximum pressure -- 250 atmospheres.
Recovered phenol ------- 4 gm. (this corresponds to 4.95 gm. of sodium phenolate).
Yield of pure hydroxytrimesic acid --------- 32.3 gm.

EXAMPLE 9

Starting materials — 142 gm. potassium carbonate.
31 gm. phenol.
50 gm. kieselgur.
Reaction temperature — 400° C.
Duration of heating — 5 hours.
CO$_2$-maximum pressure — 1500 atmospheres.
Recovered phenol — 7.3 gm.
Yield of pure hydroxy-trimesic acid — 59.9 gm.

EXAMPLE 10

Starting materials — 32 gm. sodium salicylate.
100 gm. potassium carbonate.
12 gm. "Aerosil."
Reaction temperature — 300° C.
Duration of heating — 5 hours.
CO$_2$-maximum pressure — 250 atmospheres.
Yield of pure hydroxy-trimesic acid — 39.6 gm. (91.5% of theory).

EXAMPLE 11

Starting materials — 26 gm. dipotassium-4-hydroxy-isophthalate.
100 gm. potassium carbonate.
12 gm. "Aerosil."
Reaction temperature — 300° C.
Duration of heating — 5 hours.
CO$_2$-maximum pressure — 250 atmospheres.
Yield of pure hydroxy-trimesic acid — 20.6 gm. (91% of theory).

EXAMPLE 12

Starting materials — 30 gm. salicylic acid.
140 gm. potassium carbonate.
12 gm. "Aerosil."
Reaction temperature — 300° C.
Duration of heating — 5 hours.
CO$_2$-maximum pressure — 250 atmospheres.
Yield of pure hydroxy-trimesic acid — 49.0 (almost 100% of theory).

While a number of specific embodiments of the invention have been set forth, it is to be understood that other expedients known to those skilled in the art may be employed without departing from the spirit of the invention or the scope of the appended claims.

I claim:

1. A process for the production of a tricarboxylate selected from the group consisting of hydroxytrimesic acid and its potassium salts which comprises the steps of reacting a phenol reactant selected from the group consisting of phenol, orthohydroxybenzoic acid, parahydroxybenzoic acid, 2 - hydroxyisophthalic acid, 4 - hydroxyisophthalic acid, alkali metal salts thereof and mixtures thereof, with carbon dioxide in the presence of potassium carbonate under a superatmospheric pressure of more than 100 atmospheres of carbon dioxide at a temperature above 250° C., and recovering essentially said tricarboxylate.

2. The process of claim 1 wherein said potassium carbonate is present in an amount of at least 3 mols per mol of said phenol reactant.

3. The process of claim 1 wherein said reaction is conducted at temperatures between about 275° C. and 325° C.

4. A process for the production of a tricarboxylate selected from the group consisting of hydroxytrimesic acid and its potassium salts which comprises the steps of subjecting a phenol reactant selected from the group consisting of phenol, orthohydroxybenzoic acid, parahydroxybenzoic acid, 2-hydroxyisophthalic acid, 4-hydroxyisophthalic acid, alkali metal salts thereof and mixtures thereof, to the action of carbon dioxide under a carbon dioxide pressure of more than 100 atmospheres in the presence of at least 3 mols of potassium carbonate per mol of phenol reactant at a temperature between about 275° C. and 325° C., and recovering said tricarboxylate as essentially the sole reaction product.

5. A process for the production of a tricarboxylate selected from the group consisting of hydroxytrimesic acid and its potassium salts which comprises the steps of subjecting phenol to the action of carbon dioxide under a carbon dioxide pressure of more than 100 atmospheres in the presence of at least 3 mols of potassium carbonate per mol of phenol at a temperature between about 275° C. and 325° C., and recovering said tricarboxylate as essentially the sole reaction product.

References Cited

UNITED STATES PATENTS 2,891,992    6/1959    Raecke et al. ——————— 260—515

OTHER REFERENCES

Cameron et al., J. Org. Chem., vol. 15 (1950), pp. 233–36.

Lindsey et al., "The Kolbe-Schmitt Reaction," Chemical Reviews, vol. 57, No. 4 (August 1957).

LORRAINE A. WEINBERGER, *Primary Examiner.*

R. K. JACKSON, *Examiner.*

SIDNEY B. WILLIAMS, *Assistant Examiner.*